INVENTOR
LEO R. KESSLER
BY

ATTORNEY

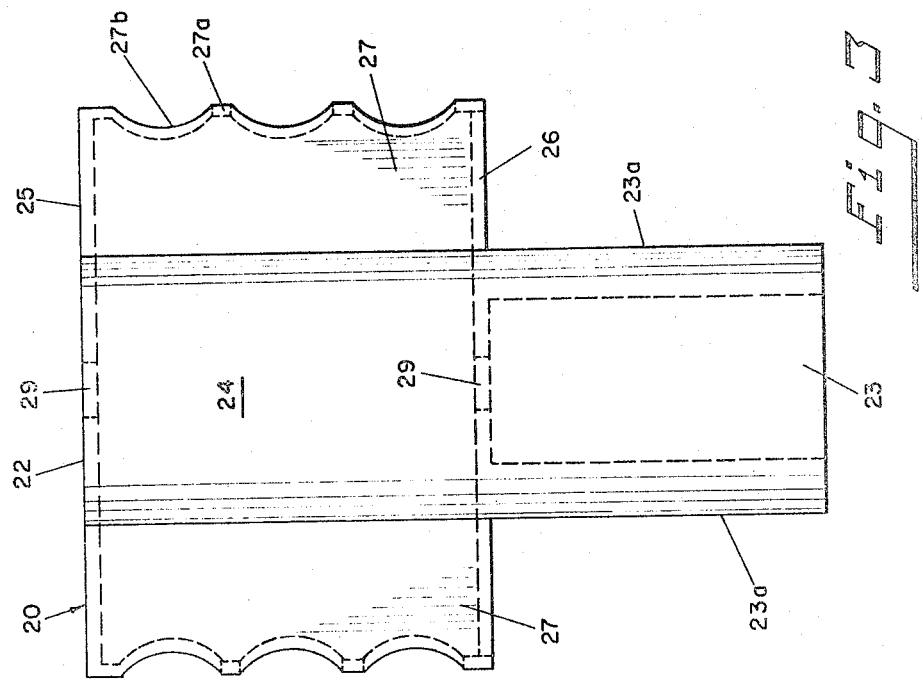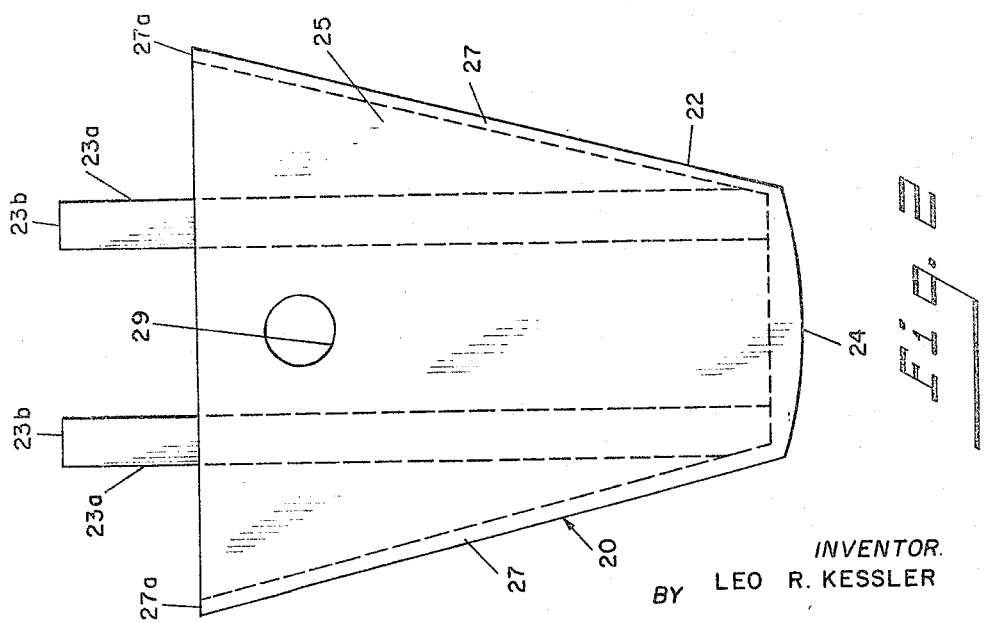

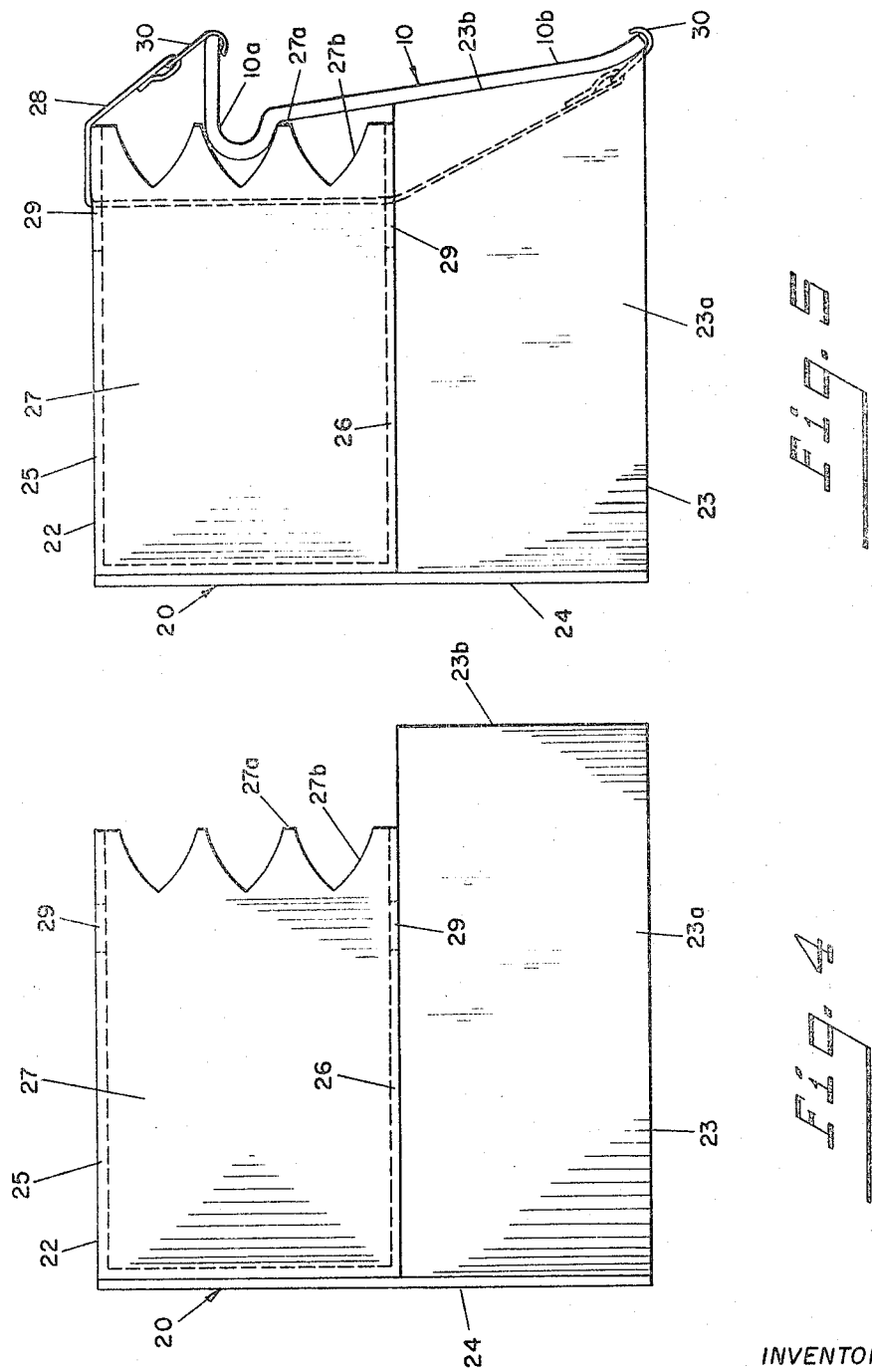

United States Patent Office 3,310,330
Patented Mar. 21, 1967

1

3,310,330
GUARD FOR VEHICLE BUMPERS
Leo R. Kessler, Madison, Wis.
(1430 Arrowhead Drive, Duluth, Minn. 55811)
Filed Oct. 18, 1965, Ser. No. 497,130
6 Claims. (Cl. 293—67)

This invention relates to bumper attachments for automobiles and the like, and more particularly to such devices which may be temporarily mounted on the bumper of an automobile to facilitate the pushing of one automobile with another.

An object of my invention is to provide a bumper attachment for automobiles which prevents the scratching, denting and damaging of the bumpers of automobiles which ordinarily may occur when one automobile is used to push another.

Another object of my invention is to provide a bumper attachment for automobiles the use of which permits automobiles with grill and body portions which extend outwardly beyond its bumper to be used to push or to be pushed by other automobiles without damaging the extending grill and body portions.

Another object of my invention is to provide a bumper attachment to facilitate the pushing of one automobile with another wherein the attachment can be quickly and easily mounted on and removed from the automobile bumper.

Another object of my invention is to provide an automobile bumper attachment which can be readily adapted to fit a variety of bumper configurations.

Another object of my invention is to provide an automobile bumper attachment the use of which will permit automobiles having bumpers which do not properly mate because of their respective configurations to be pushed one by the other.

Still another object of my invention is to provide a bumper attachment having a substantially vertically disposed pushing surface which eliminates the sliding over or under one another which ordinarily occurs with the usual convex bumpers.

A further object of my invention is to provide an automobile bumper attachment which is inexpensive and simple in construction and which is effective and durable in use.

Other objects, features and advantages of my invention will be readily apparent from the following detailed description taken in conjunction with the accompanying drawings wherein a preferred embodiment of the principles of the invention has been selected for exemplification.

In the drawings:

FIG. 2 is a plan view of the body member of the bumper attachment of FIG. 1.

FIG. 3 is a front elevation view of the body member of the bumper attachment shown in FIG. 1.

FIG. 4 is a side elevation view of the body member of the bumper attachment of FIG. 1.

FIG. 5 is a side elevation view of the bumper attachment of FIG. 1 attached to an automobile bumper.

Figure 1:
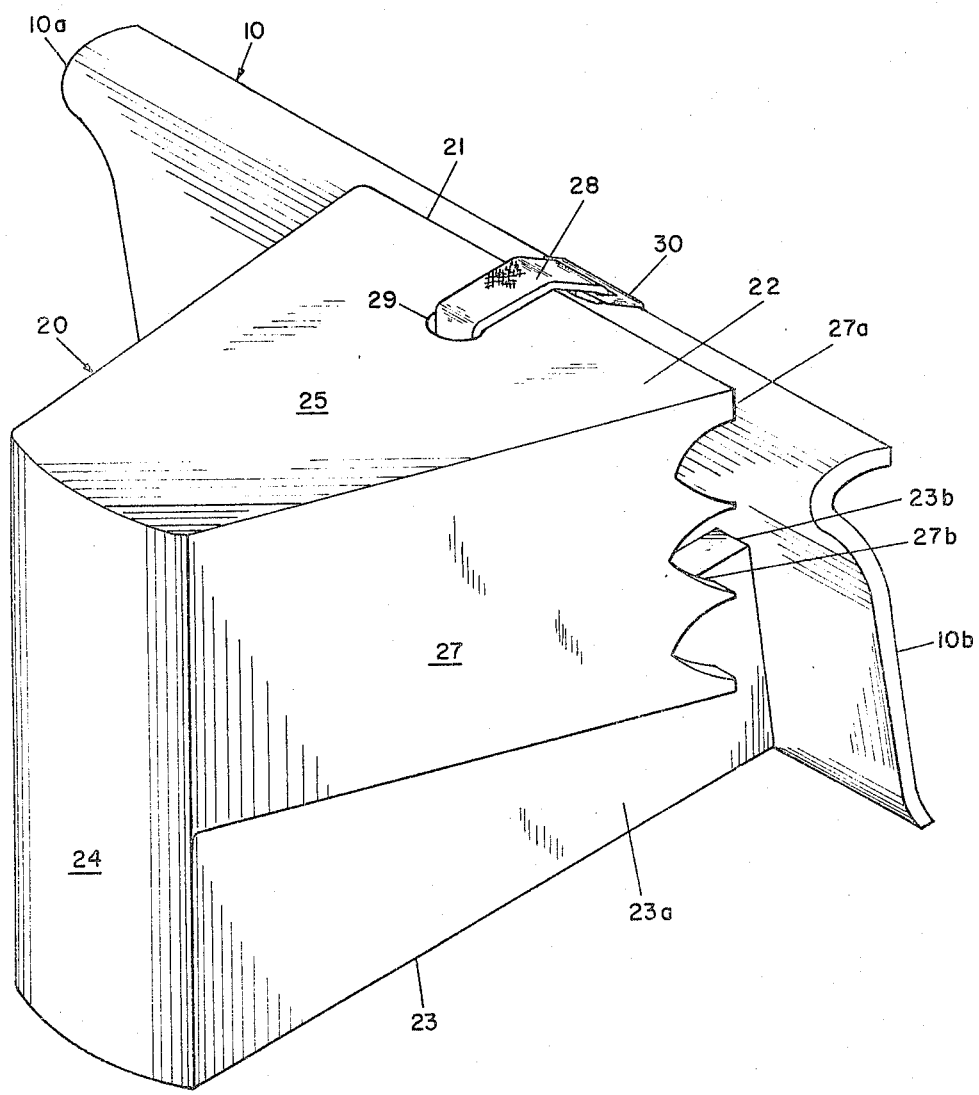
FIG. 1 is a fragmentary perspective view showing a bumper attachment embodying my invention attached to an automobile bumper.

Referring now more particularly to the drawings wherein like numerals refer to like parts throughout the several views, FIG. 1 shows my bumper attachment generally at 20 attached on the bumper 10 of an automobile (not shown). As seen in FIGS. 1 and 4 the bumper 10 has an upper convex ridge portion 10a and a depending lower flange portion 10b. The bumper 10 is rigidly mounted on an automobile by a plurality of roundheaded studs 11.

2

As shown in FIGS. 1–5, my bumper attachment 20 comprises a substantially rigid body member 21 having an upper portion 22, a lower portion 23 and a substantially vertically disposed pushing surface 24. The body member 21 is preferably made of plastic or other suitable material.

Preferably, the upper portion 22 of body member 21 is hollow and has a top wall 25, a bottom wall 26 and a pair of rearwardly diverging side walls 27. Top wall 25 and bottom wall 26 are substantially trapezoidal in shape. The rear ends of side walls 27 provide attaching surfaces 27a which have substantially horizontally disposed concave attaching grooves 27b formed therein for accommodating the convex ridge portion 10a of the bumper 10 as best seen in FIGS. 1 and 5.

The lower portion 23 of body member 21 comprises a pair of flanges 23a which depend from bottom wall 26 of upper portion 22 and are disposed substantially at 90° thereto. Lower portion flanges 23a have rear surfaces 23b which extend outwardly beyond attaching surface 27a as shown in FIG. 4. The rear end of flanges 23a may be cut-off as shown in FIG. 5 to substantially conform to the configuration of the flange portion 10b of the bumper 10 against which the flanges 23a bear. The cut may be made by the user with an ordinary hand saw or the like.

The rear bearing surfaces 23b of the flanges 23a should be cut so that the pushing surfaces 24 will be substantially vertical. When flanges 23a are so cut, the bumper of the automobile engaged against the pushing surface 24 will not have a tendency to slide upward or downward on the pushing surface 24, but instead, the pushing force will be applied substantially perpendicularly to the vretically disposed pushing surface 24.

While the lower flange portion 10b of bumper 10 shown in the drawings is inclined with respect to the vertical, it is understood that in some automobiles this lower flange portion 10b may be substantially vertical or inclined forwardly or rearwardly in which case, the bearing surfaces 23b should be cut accordingly so the pushing surface 24 of body member 21 will be substantially vertical when the attachment 20 is in use.

As best seen in FIGS. 1 and 2, the pushing surface 24 is preferably slightly convex so that as the bumper of the automobile pushing against it can pivot on it without breaking down the outer edges of the pushing surface 24.

As shown in FIGS. 1 and 5, the body member 21 is attached to the bumper 10 of an automobile by an elastic strap 28 which extends through a pair of holes 29 in top and bottom walls 25 and 26 of upper portion 22 of the body member 21 and extends around the bumper 10. The strap 28 extends downwardly between the pair of lower flanges 23a. Strap 28 has a pair of hooked clamps 30 which are adapted to be hooked over the top and bottom edges of bumper 10 as seen in FIG. 5.

The elasticity of strap 28 allows the attachment 20 to be tightly mounted on automobile bumpers of various sizes and shapes. While the bumper 10 shown in the drawings has a horizontally disposed upper convex ridge 10a and a substantially vertically disposed lower flange 10b, it is understood that my attachment will readily accommodate and be satisfactorily attached to bumpers of various configurations both with and without horizontal convex ridges such as 10a.

Preferably, my bumper attachment is about nine inches in length from attaching surface 27a to pushing surface 24. This permits it to be effectively used on automobiles of present modern design which often have grill portions and body portions such as fenders and the rear wall of the trunk which extend outwardly beyond the bumper of the automobile. The nine inch length between attaching surface 27a and pushing surface 24 will prevent the bumper, grill, and body portions of either automobile from contacting the other automobile.

It is understood that bumper attachment 20 may be attached to the rear bumper of the automobile being pushed or to the front bumper of the automobile doing the pushing. It is further understood that one bumper attachment, preferably attached near the center of the bumper, can be utilized or two or more attachments may be employed.

It is further understood that my invention is not confined to the particular construction and arrangement of parts herein illustrated and described, but embraces all such modified forms thereof as come within the scope of the following claims.

I claim:

1. A bumper attachment for automobiles and the like comprising:
   (a) a substantially rigid body member having an upper portion, a lower portion, and a substantially vertically disposed pushing surface,
   (b) said upper portion having an attaching surface opposite said pushing surface,
   (c) said attaching surface having at least one transverse attaching groove therein for receiving a portion of the bumper of an automobile,
   (d) said lower portion having a rear bearing surface spaced longitudinally from said pushing surface for bearing against the bumper of said automobile,
   (e) said upper portion being flared outwardly toward said attaching surface whereby said upper portion has substantially greater width than said bearing surface for lateral stability, and
   (f) fastening means for extending around the top and bottom edges of the bumper of said automobile for releasably attaching said body member to the bumper of said automobile.

2. The bumper attachment as specified in claim 1 wherein said upper portion has at least one opening therethrough and said fastening means comprises an elastic belt extending through said opening and having a pair of rigid hooked members for hooking the top and bottom edges of the bumper on said automobile.

3. The bumper attachment as specified in claim 1 wherein said attaching surface has a plurality of vertically spaced attaching grooves therein for adjustably mounting said body member on the bumper of said automobile.

4. The bumper attachment as specified in claim 1 wherein said rear bearing surface conforms substantially to the configuration of that portion of the bumper of said automobile which engages.

5. The bumper attachment as specified in claim 1 wherein said pushing surface is curved about a substantially vertical axis.

6. A bumper attachment for automobiles and the like, comprising:
   (a) a substantially rigid body member having a substantially hollow upper portion, a lower portion, and a substantially vertically disposed pushing surface,
   (b) said upper portion having a flared top wall, a flared bottom wall and a pair of divergently extending side walls,
   (c) said upper portion having transverse attaching grooves in said side walls opposite said pushing surface,
   (d) said lower portion having a rear bearing surface spaced longitudinally from said pushing surface for bearing against the bumper of said automobile,
   (e) said grooves being positioned outwardly of said bearing surface for lateral stability, and
   (f) an elastic belt extending through said top and bottom walls between said sidewalls, said belt having a pair of rigid hooked members on the ends thereof for hooking the top and bottom edges of the bumper for releasably attaching said body member to the bumper of said automobile.

References Cited by the Examiner

UNITED STATES PATENTS

| | | | |
|---|---|---|---|
| 1,744,408 | 1/1930 | Millard | 293—71 |
| 2,188,082 | 1/1940 | Imhofe | 293—71 |
| 2,271,046 | 1/1942 | Sing | 293—71 |
| 2,679,405 | 5/1954 | Snyder | 280—481 |
| 2,762,646 | 9/1956 | Dollar | 293—71 |
| 3,110,516 | 11/1963 | Sukala | 293—65 |

ARTHUR L. LA POINT, *Primary Examiner.*

H. BELTRAN, *Assistant Examiner.*